United States Patent
Jang et al.

(10) Patent No.: US 10,382,693 B2
(45) Date of Patent: Aug. 13, 2019

(54) MOBILE TERMINAL

(71) Applicant: LG ELECTRONICS INC., Seoul (KR)

(72) Inventors: Yujune Jang, Seoul (KR); Bongjeong Jeon, Seoul (KR); Jie Seol, Seoul (KR); Seongeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 15/457,517

(22) Filed: Mar. 13, 2017

(65) Prior Publication Data
US 2018/0109732 A1 Apr. 19, 2018

(30) Foreign Application Priority Data

Oct. 19, 2016 (KR) .................. 10-2016-0135782

(51) Int. Cl.
H04M 1/02 (2006.01)
G06F 16/40 (2019.01)
H04L 12/58 (2006.01)
H04M 1/725 (2006.01)
H04N 5/232 (2006.01)
(Continued)

(52) U.S. Cl.
CPC ....... H04N 5/23293 (2013.01); G06F 3/0481 (2013.01); G06F 3/0482 (2013.01); G06F 3/0483 (2013.01); G06F 3/0485 (2013.01); G06F 3/0488 (2013.01); G06F 3/04817 (2013.01); G06F 3/04842 (2013.01); G06F 3/04845 (2013.01); G06F 3/04855 (2013.01); G06F 16/40 (2019.01); H04L 51/16 (2013.01); H04M 1/0202 (2013.01); H04M 1/72522 (2013.01); H04N 5/232939 (2018.08); H04N 5/2628 (2013.01); G06F 3/04883 (2013.01); G06F 2203/04803 (2013.01); G06F 2203/04806 (2013.01); H04L 51/10 (2013.01)

(58) Field of Classification Search
CPC ........ H04N 5/23293; H04N 5/232939; H04N 5/2628; G06F 17/30017; G06F 3/04817; G06F 3/04842; G06F 3/04855; G06F 3/0488; H04M 1/72522; H04M 1/0202; H04L 51/16; H04L 51/10
See application file for complete search history.

(56) References Cited

U.S. PATENT DOCUMENTS 9,292,151 B1 * 3/2016 Campiranon ........... G06F 3/048
2007/0130515 A1 * 6/2007 Maas ...................... G06T 19/00
715/201
(Continued)

Primary Examiner — Timothy J Henn
(74) Attorney, Agent, or Firm — Birch, Stewart, Kolasch & Birch, LLP

(57) ABSTRACT

A mobile terminal including a memory; a display configured to display a captured image; and a controller configured to receive a request for acquiring associated captured images associated with the captured image, acquire the associated captured images based on information on the captured image stored in the memory according to the received request, and display, around the captured image, a first set of associated captured images captured through an application corresponding to the captured image and a second set of associated captured images acquired based on information included in the captured image among the acquired associated captured images.

18 Claims, 19 Drawing Sheets

(51) Int. Cl.
*H04N 5/262* (2006.01)
*G06F 3/0481* (2013.01)
*G06F 3/0482* (2013.01)
*G06F 3/0483* (2013.01)
*G06F 3/0484* (2013.01)
*G06F 3/0485* (2013.01)
*G06F 3/0488* (2013.01)

(56) References Cited

U.S. PATENT DOCUMENTS

| | | | | |
|---|---|---|---|---|
| 2009/0125842 A1* | 5/2009 | Nakayama | ............ | G06F 3/0482 |
| | | | | 715/835 |
| 2009/0158214 A1* | 6/2009 | Arnold | ................ | G06F 17/3005 |
| | | | | 715/830 |
| 2011/0018827 A1* | 1/2011 | Wang | .................... | G06F 3/0482 |
| | | | | 345/173 |
| 2011/0058087 A1* | 3/2011 | Ito | ...................... | H04N 5/23245 |
| | | | | 348/333.12 |
| 2014/0359489 A1* | 12/2014 | Zhao | ................. | G06F 17/30876 |
| | | | | 715/760 |
| 2015/0135140 A1* | 5/2015 | Kobayashi | ............ | G06F 3/0485 |
| | | | | 715/830 |
| 2015/0153910 A1* | 6/2015 | Wheeler | ............... | G06F 3/0482 |
| | | | | 715/719 |
| 2015/0339006 A1* | 11/2015 | Chaland | ................ | G06F 3/0482 |
| | | | | 715/835 |
| 2015/0356245 A1* | 12/2015 | Kozuka | ................. | G06F 19/321 |
| | | | | 705/2 |
| 2017/0038961 A1* | 2/2017 | Fram | ....................... | G06F 3/044 |

* cited by examiner

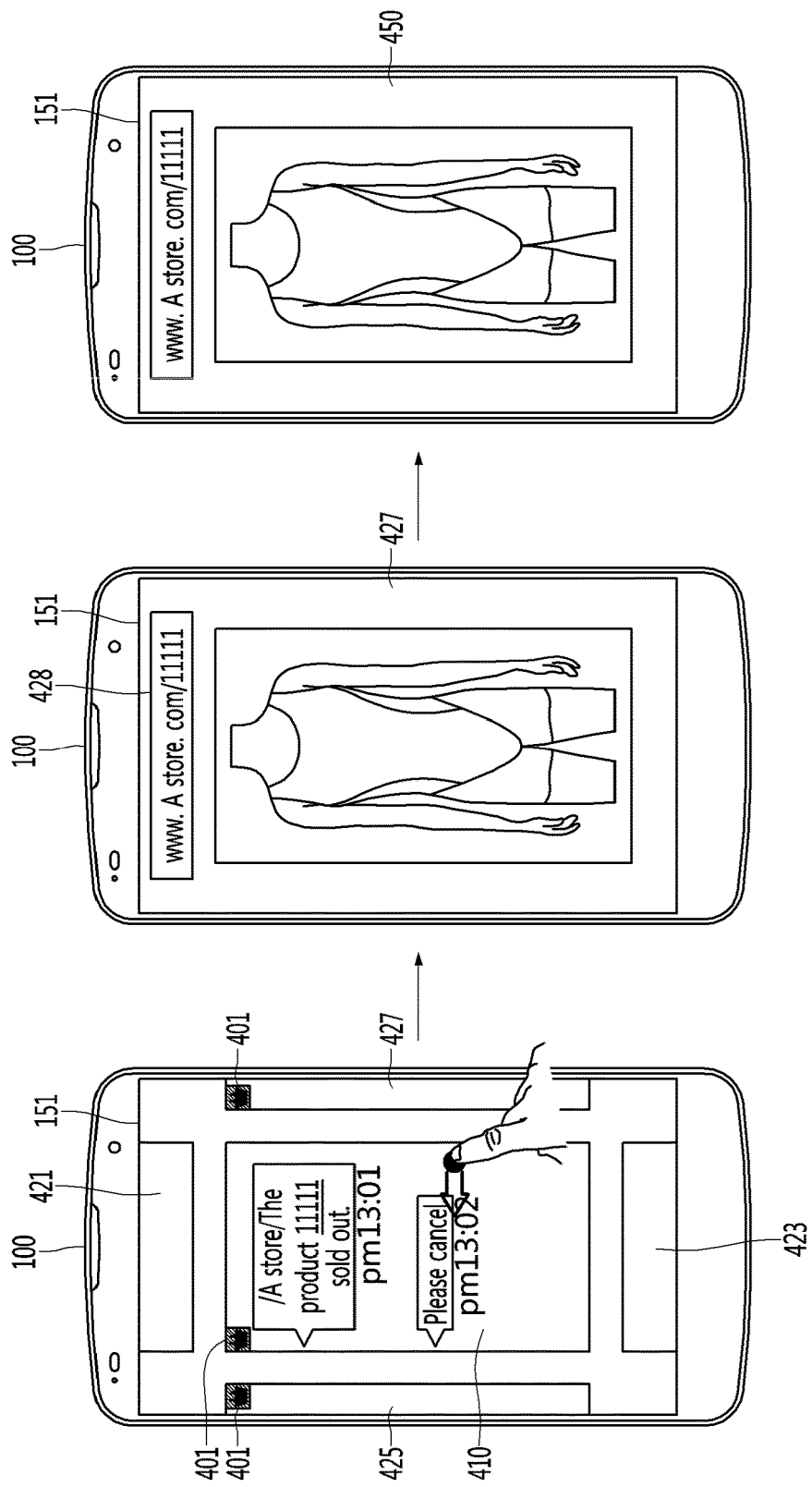

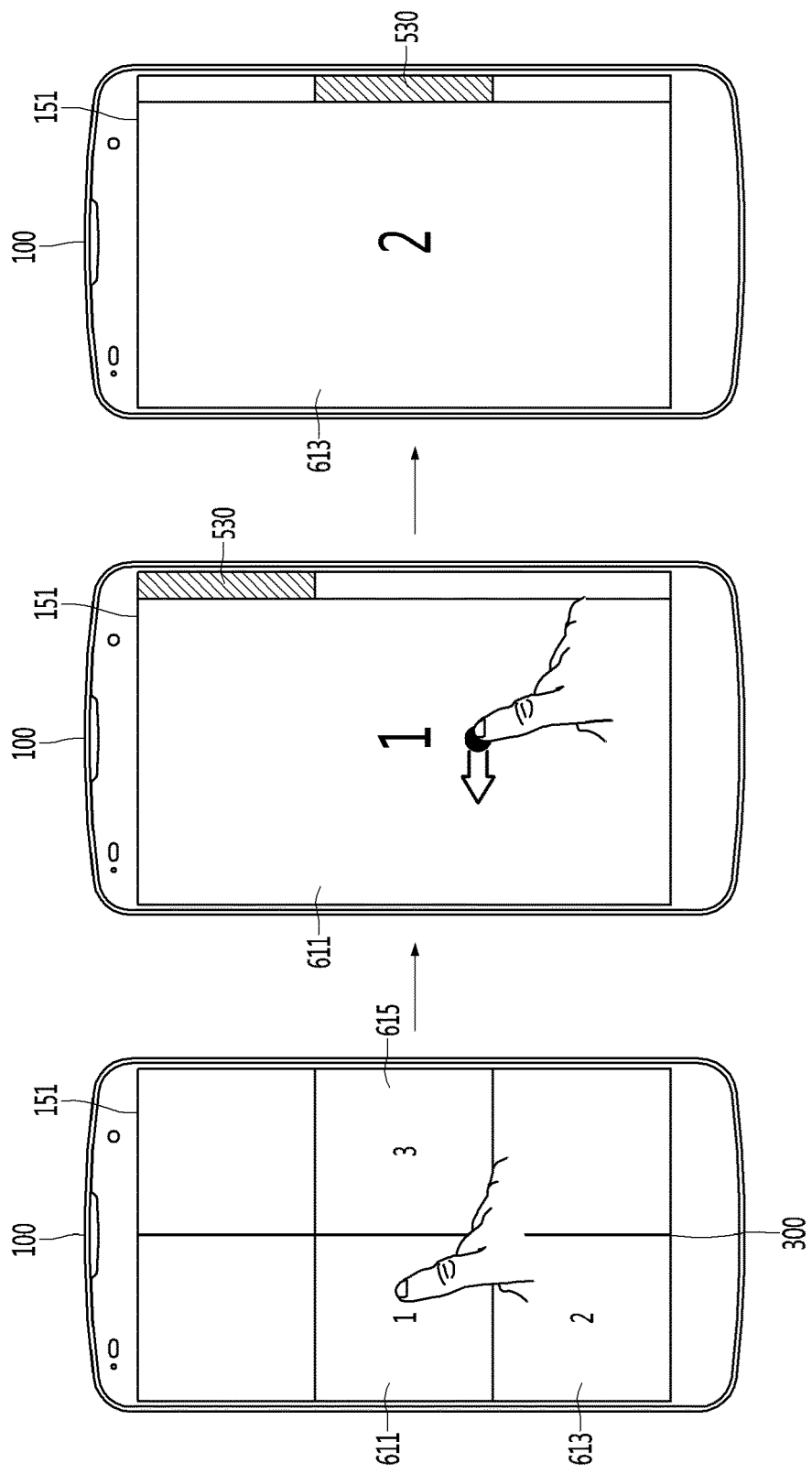

MOBILE TERMINAL

CROSS-REFERENCE TO RELATED APPLICATION

This application claims priority under 35 U.S.C. § 119 and § 365 to Korean Patent Application No. 10-2016-0135782, filed in the Korean Intellectual Property Office on Oct. 19, 2016, the disclosure of which is incorporated herein by reference.

BACKGROUND OF THE INVENTION

1. Field of the Invention

The present invention relates to a mobile terminal and, more particularly, to providing other captured images associated with a captured image.

2. Description of the Related Art

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

A user can capture information displayed on a mobile terminal according to a capture command. The captured images may be stored according to capture time point. However, in the related art, since captured images are sequentially displayed according to the capture time point, other captured images associated with a captured image should be individually searched for. That is, the user has to search for the other images associated with the captured image through several user inputs.

SUMMARY OF THE INVENTION

Accordingly, an object of the present invention is to address the above-noted and other problems.

An object of the present invention is to provide a mobile terminal capable of automatically acquiring associated captured images associated with a captured image without a complicated process.

Another object of the present invention is to rapidly provide associated captured images associated with a captured image to a user.

A mobile terminal according to an embodiment of the present invention includes a memory, a display unit configured to display a captured image, and a controller configured to receive a request for acquiring associated captured images associated with the captured image, to acquire the associated captured images based on information on the captured image stored in the memory according to the received request, and to arrange, around the captured image, a first set of associated captured images captured through an application corresponding to the captured image and a second set of associated captured images acquired based on information included in the captured image among the acquired associated captured images.

According to various embodiments of the present invention, a user can easily confirm images associated with a captured image without several inputs.

According to various embodiments of the present invention, it is possible to reduce a time required for a user to find images associated with a captured image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIGS. 4A and 4B are diagrams illustrating examples of providing associated captured images associated with a captured image according to another embodiment of the present invention.

FIGS. 5A and 5B are diagrams illustrating examples of providing associated captured images associated with a captured image according to another embodiment of the present invention.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. It will be understood that if an element is referred to as being "connected with" another element, the element can be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
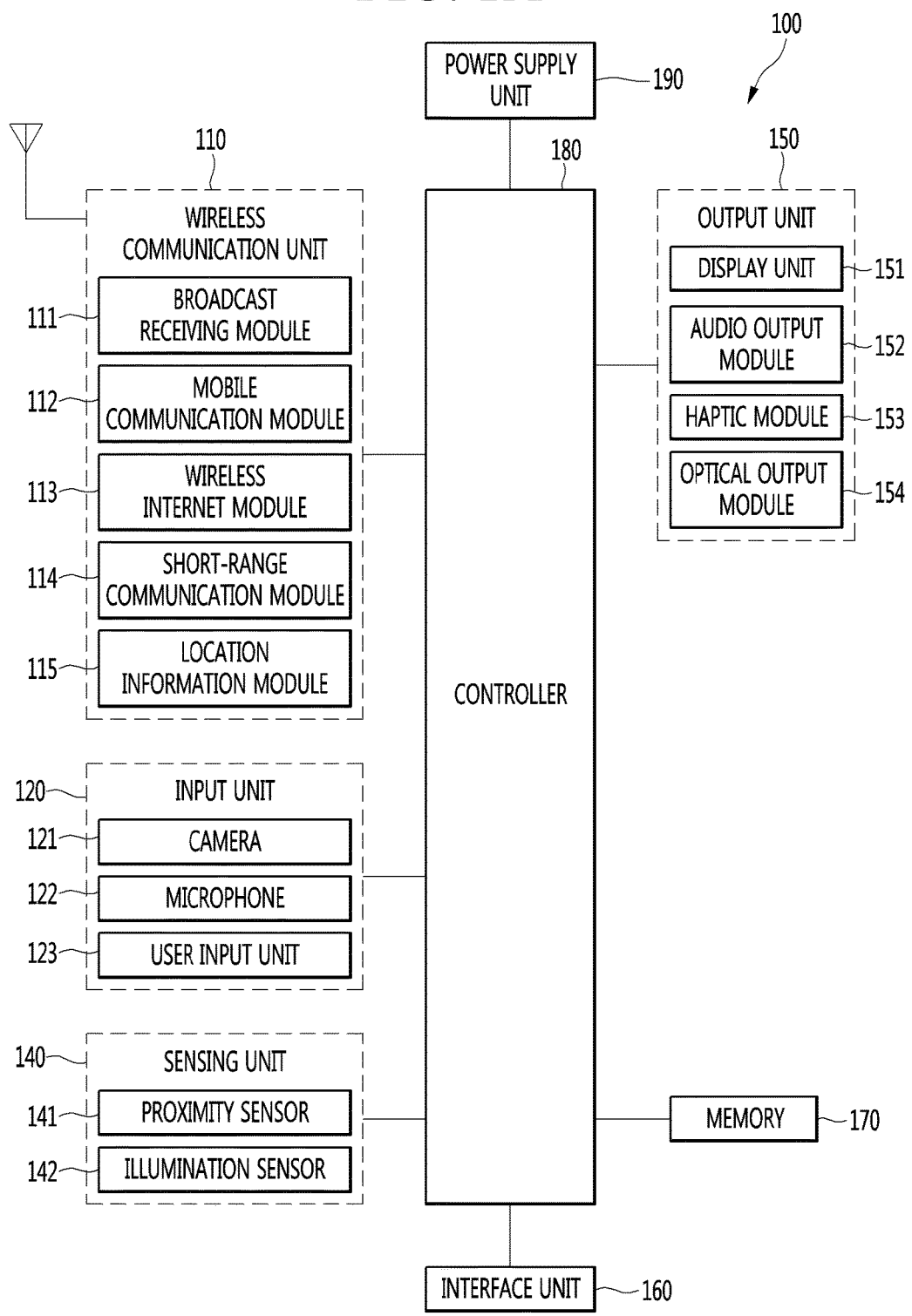
FIG. 1A is a block diagram of a mobile terminal in accordance with the present disclosure.

FIG. 1A is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, if the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, if the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, if a call is received in the mobile terminal 100, the user can answer the call using the wearable device. Also, if a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, if the mobile terminal uses a GPS module, a position of the mobile terminal can be acquired using a signal sent from a GPS satellite. As another example, if the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 can be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 can be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. If the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

If a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail can be displayed with a horizontal distance difference there between by a depth corresponding to the disparity between the left image and the right image on the screen, thereby providing a stereoscopic space sense.

A left image and a right image required for implementing a 3D stereoscopic image can be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

If the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications if a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Figure 1B:
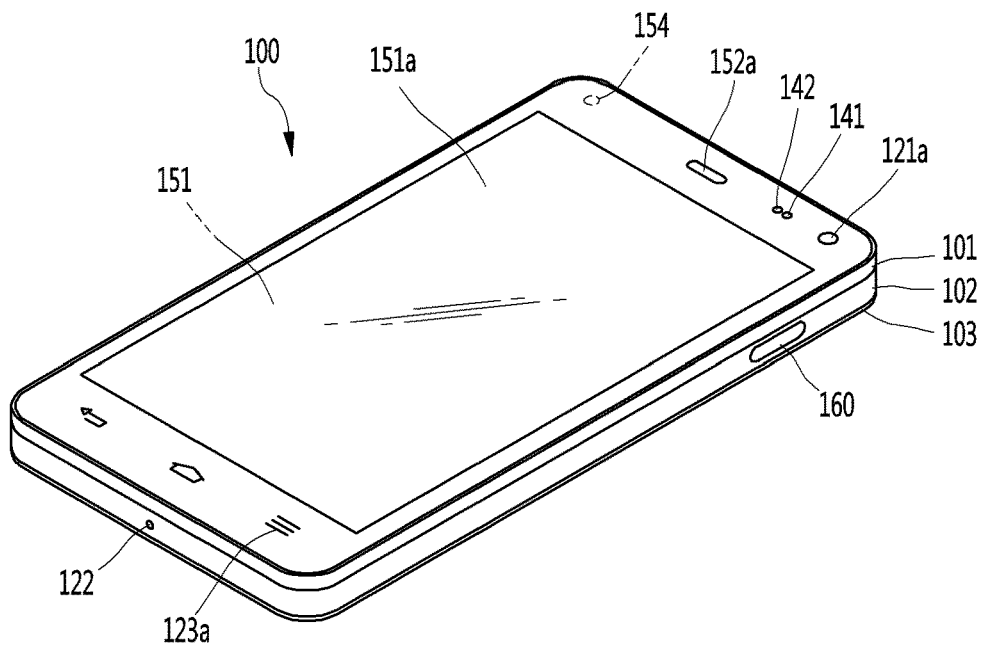
FIGS. 1B and 1C are conceptual views of one example of the mobile terminal, viewed from different directions.
Figure 1C:
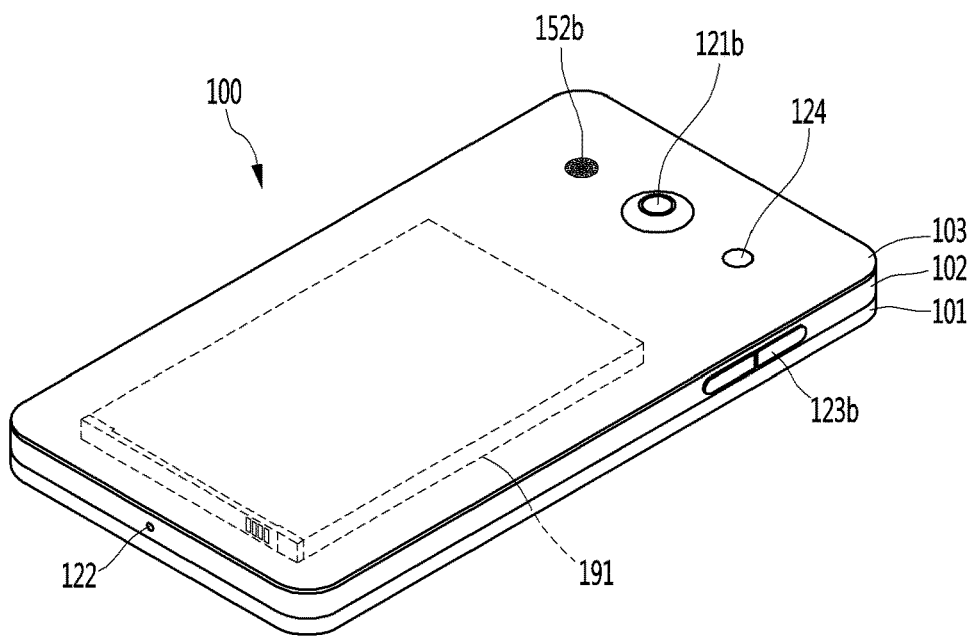

Referring now to FIGS. 1B and 1C, the mobile terminal 100 is described with reference to a bar-type terminal body.

However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, if the rear cover 103 is detached from the rear case 102, the electronic components mounted to the rear case 102 are externally exposed.

As illustrated, if the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 can be arranged on one side, either spaced apart from each other, or these devices may be integrated, or these devices can be arranged on different surfaces.

The display unit 151 may also include a touch sensor which senses a touch input received at the display unit. If a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. If a user has checked a generated event, the controller can control the optical output unit 154 to stop the light output. The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger if the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." If the second camera 121b is implemented as an array camera, images may be captured in various manners using the plurality of lenses and images with better qualities.

As shown in FIG. 1C, a flash 124 is shown adjacent to the second camera 121b. If an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. If the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI. Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like. The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 2:
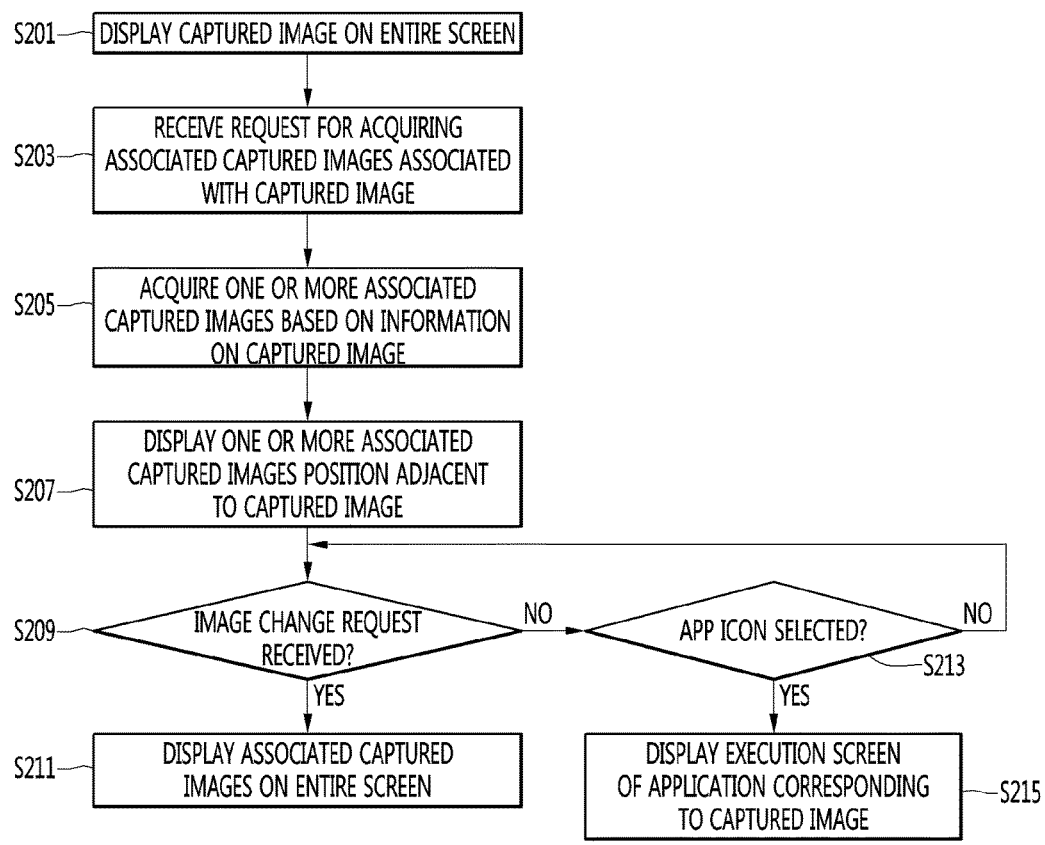
FIG. 2 is a flowchart illustrating a mobile terminal according to an embodiment of the present invention.

FIG. 2 is a flowchart illustrating a mobile terminal according to an embodiment of the present invention. Referring to FIG. 2, the controller 180 of the mobile terminal 100 displays a captured image on the entire screen of the display unit 151 (S201).

The captured image may be stored in the memory 170 of the mobile terminal 100. The captured image may also be stored in an external memory connected to the interface unit 160 of the mobile terminal 100. Further, the captured image may be an image captured according to a capture command when content is displayed on the display unit 151 of the mobile terminal 100.

The captured image displayed on the entire screen may be an image corresponding to any one of the images displayed on an image list displayed by executing a gallery application. The controller 180 receives a request for acquiring captured images associated with the displayed captured image (S203).

The associated captured images may be images which are associated with the displayed captured image and captured in advance. The request for acquiring the associated captured images may be input touching the captured image displayed on the display unit 151 for a predetermined time or more.

In addition, the request for acquiring the associated captured images may be a force touch input pressing the captured image with a pressure of a predetermined strength. The request for acquiring the associated captured images may be a request for selecting an associated icon displayed on the captured image, and the associated captured images can be acquired based on information on the displayed captured image.

The information on the captured image may include content included in the captured image, a capture time point of the captured image, a scroll bar image included in the captured image and application information for providing an object to be captured. The content included in the captured image may include metadata of the content.

Further, the controller 180 acquires one or more associated captured images based on the information on the displayed captured image according to the received request (S205). The controller 180 can acquire the information on the captured image upon capturing the captured image. In this instance, the information on the captured image may be stored in the memory 170 of the mobile terminal 100. The memory 170 of the mobile terminal 100 may also store the captured image and the information on the captured image corresponding thereto.

In addition, the controller 180 can acquire the information on the captured image upon receiving the request for acquiring the associated captured images. The controller 180 also displays one or more associated captured images at positions adjacent to the displayed captured image (S207). In particular, the controller 180 can arrange or display a first set of associated captured images of the plurality of associated captured images in the vertical direction of the captured image and arrange or display a second set of captured images of the plurality of associated captured images in the horizontal direction of the captured image.

The first set of associated captured images can be captured through an application corresponding to the captured image, and the application corresponding to the captured image can provide content to be captured. Further, the second set of associated captured images may be associated with the information included in the captured image, and the information included in the captured image may be any one of a scroll bar and the content of the captured image.

In addition, the controller 180 can arrange one or more associated captured images associated with the captured image in upper, lower, left and right directions of the captured image. For example, the controller 180 can arrange the images captured through the application for providing the captured image in the upper-and-lower direction of the captured image. The controller 180 can also arrange the images captured through the application for providing the captured image in the upper-and-lower direction according to the capture time point.

In addition, the controller 180 can arrange the associated captured images associated with the captured image in the left-and-right direction. However, this is merely exemplary and the upper-and-lower direction and the left-and-right direction may be reversed.

The controller 180 displays the associated captured images on the entire screen of the display unit 151 (S211), if an image change request is received (S209). The image change request may be a request for displaying any one of one or more associated captured images arranged around the captured image on the center of the screen of the display unit 151. Further, a user can easily view the images associated with the captured image without a complicated process.

Figure 3A:
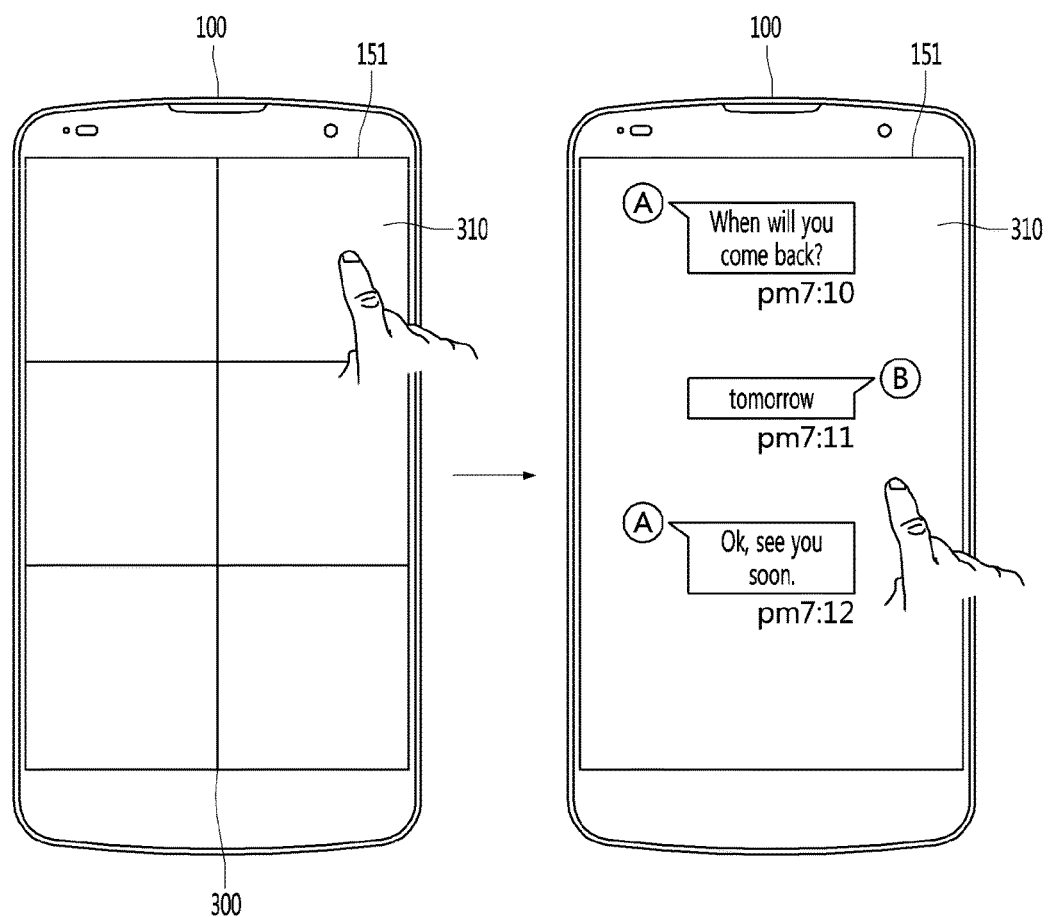
FIGS. 3A and 3B are diagrams illustrating examples of providing associated captured images associated with a displayed captured image according to an embodiment of the present invention.
Figure 3B:
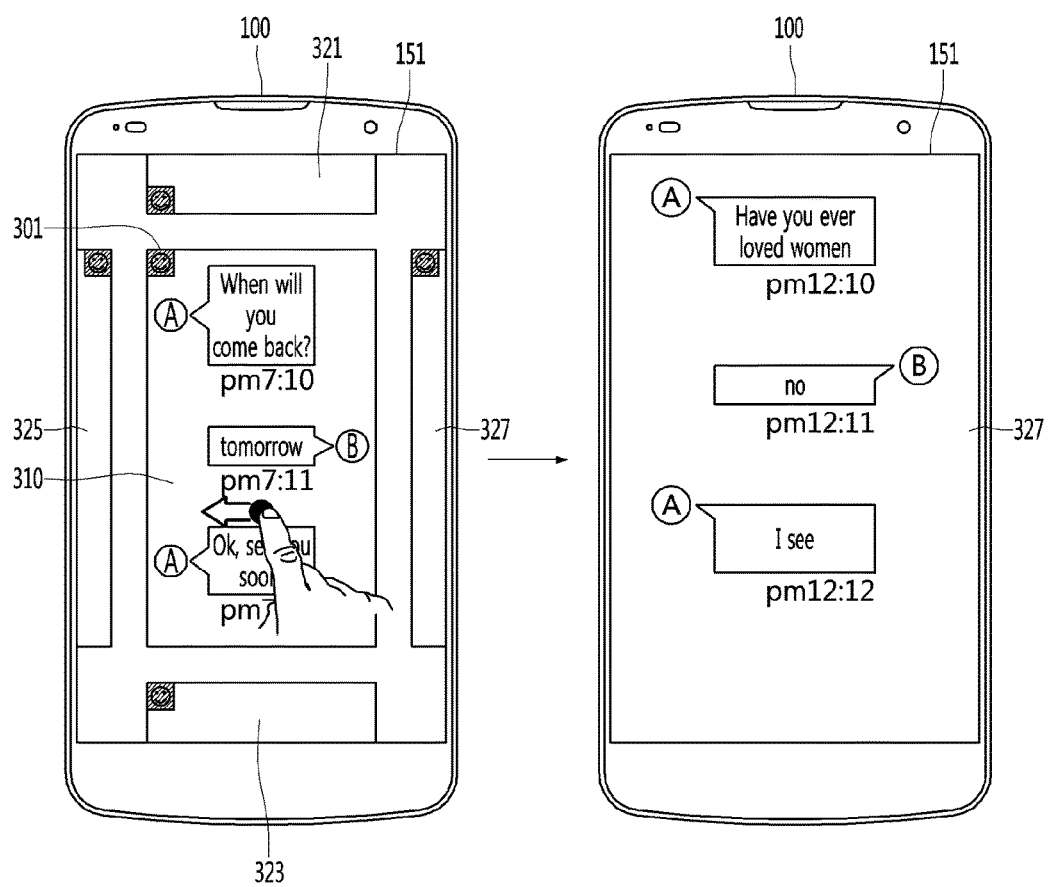

Hereinafter, the process of steps S201 to S211 will be described. In particular, FIGS. 3A and 3B are diagrams illustrating examples of providing associated captured images associated with a displayed captured image according to an embodiment of the present invention. Referring to FIG. 3A, the display unit 151 of the mobile terminal 100 displays a captured image 310. The captured image 310 may be an image selected from an image list displayed on an execution screen 300 of a gallery application, an image captured from an execution screen of a message service application, etc.

The controller 180 can receive an acquisition request for providing an associated captured image associated with the captured image 310. In particular, the acquisition request for providing the associated captured images may be a request for selecting the captured image 310 for a predetermined time or more. The controller 180 can also display associated captured images 321 to 327 around the captured image 310 according to the received request, as shown in FIG. 3B.

The controller 180 can scale down the captured image 310 displayed on the entire screen and arrange the associated captured images 312 to 327 around the captured image 310, according to the acquisition request. The associated captured images 321 to 327 can be arranged in the upper, lower, left and right directions of the captured images 310, in order to diversify images to be selected by the user.

In one embodiment, some or all of the associated captured images 321 to 327 can be displayed in the upper, lower, left and right directions of the captured image 310. The first associated captured image 321 and the second associated captured image 323 arranged in the upper and lower directions of the captured image 310 may also be arranged according to the capture time point of the execution screen of the application corresponding to the captured image 310.

For example, if the captured image 310 is acquired by capturing the execution screen of the message service application at 7:12 pm, the controller 180 can arrange the first associated captured image 321 acquired by capturing the execution screen of the message service application before 7:20 pm in the upper direction of the captured image 310.

Similarly, the controller 180 can arrange the second associated captured image 323 acquired by capturing the execution screen of the message service application before 7:12 pm in the lower direction of the captured image 310. The third associated captured image 325 and the fourth associated captured image 327 arranged in the left and right directions of the captured image 310 can be acquired based on content of the captured image 310.

For example, if the captured image 310 includes content of a conversation between a user A and a user B through the message service application, the controller 180 can search the memory 170 for images including the content of the conversation between user A and user B through the message service application.

The controller 180 can acquire the third associated captured image 325 and the fourth associated captured image 327 including the content of the other conversations between user A and user B according to the search result. The controller 180 can then arrange the third associated captured image 325 and the fourth associated captured image 327 in the left and right directions of the captured image 310. The user can thus easily confirm the associated captured images associated with the captured image without a complicated process for searching for the images associated with the captured image.

In FIG. 3B, an app icon 301 for identifying the message service application corresponding to the captured image 310 may be further displayed on the captured image 310. The message service application corresponding to the captured image 310 may be an application for providing the content of the captured image 310 if the captured image 310 is acquired. Similarly, app icons for identifying the applications corresponding to the captured images may be further displayed on the first to fourth associated captured images 321 to 327.

In FIG. 3B, if input of flicking the captured image in the left direction is received when the captured image 310 is selected, the controller 180 can display the fourth associated captured image 327 arranged in the right direction of the captured image 310 on the entire screen of the display unit 151. The user can thus easily receive images acquired by capturing the content of the conversation between the same users without a complicated process.

Figure 4A:
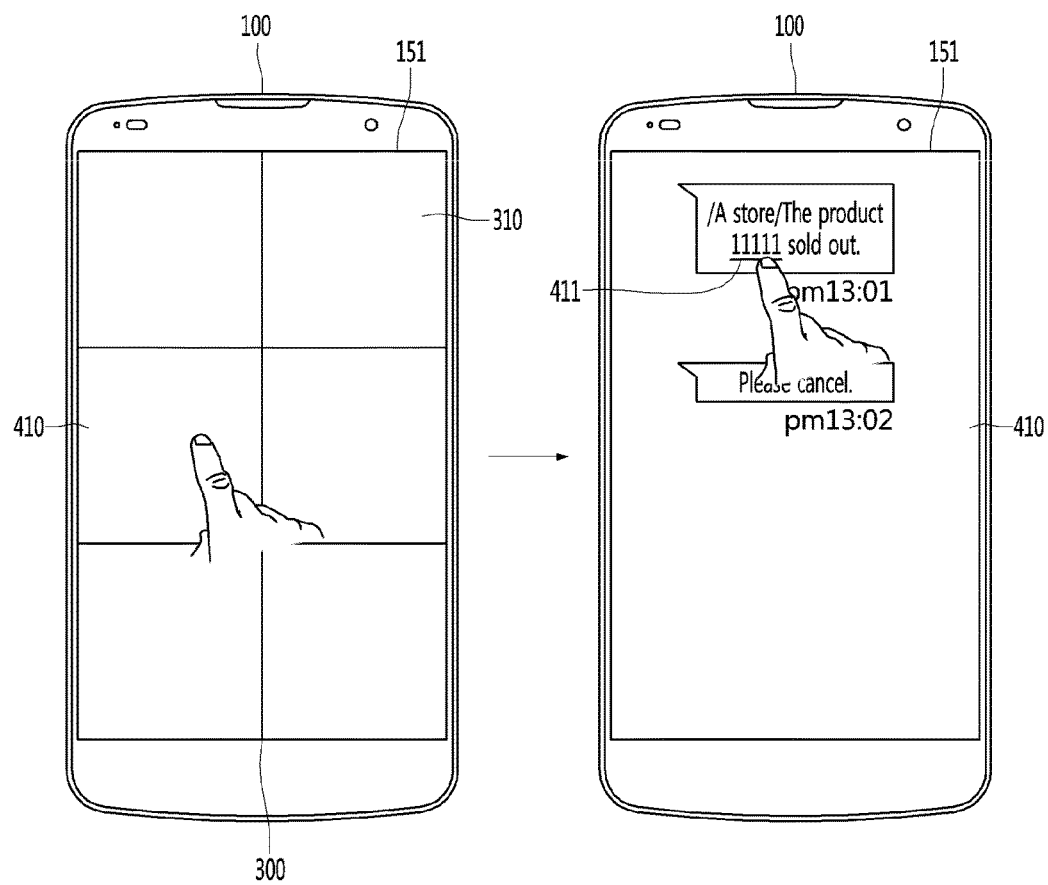

Next, FIGS. 4A and 4B are diagrams illustrating examples of providing associated captured images associated with a captured image according to another embodiment of the present invention. Referring to FIG. 4A, the display unit 151 of the mobile terminal 100 displays a captured image 410, which may be an image selected from an image list displayed on the execution screen 300 of the gallery application.

Further, the captured image 410 may be an image captured from the execution screen of a shopping service application. The controller 180 can also receive an acquisition request for providing captured images associated with the captured image 410. For example, the acquisition request may be a request for selecting the captured image 410 for a predetermined time.

The controller 180 can display associated captured images 421 to 427 around the captured image 310 according to the received request, as shown in FIG. 4B. The controller 180 can also scale down the captured image 410 displayed on the entire screen and arrange the associated captured images 412 to 427 around the captured image 310, according to the acquisition request.

As shown, the associated captured images 421 to 427 can be arranged in the upper, lower, left and right directions of the captured images 410, in order to diversify images to be selected by the user. Some or all of the associated captured images 421 to 427 can be displayed in the upper, lower, left and right directions of the captured image 310.

Further, the first associated captured image 421 and the second associated captured image 423 arranged in the upper and lower directions of the captured image 410 can be arranged according to the capture time point of the execution screen of the shopping service application corresponding to the captured image 310. The third associated captured image 425 and the fourth associated captured image 427 arranged in the left and right directions of the captured image 410 can be acquired based on link information 411 included in the captured image 410.

The link information 411 may be stored along with the captured image 410 as metadata if the captured image 410 is stored in the memory 170. For example, if the captured image 410 includes the link information 411 for providing the shopping service related to product purchase, the controller 180 can search for images captured from a website screen corresponding to the link information 411 according to a request for acquiring associated captured images.

The controller 180 can also acquire the third associated captured image 425 and the fourth associated captured image 427 including the website screen corresponding to the link information according to the search result. The controller 180 can then arrange the third associated captured image 425 and the fourth associated captured image 427 in the left and right directions of the captured image 410. The user can thus easily confirm the associated captured images associated with the captured image without a complicated process of searching the associated captured images associated with the captured image.

In FIG. 4B, an app icon 401 for identifying the shopping service application corresponding to the captured image 310 can also be displayed on the captured image 310. In addition, the shopping service application corresponding to the captured image 410 may be an application for providing the content of the captured image 410 if the captured image 410 is acquired. Similarly, app icons for identifying the applications corresponding to the captured images can be further displayed on the first to fourth associated captured images 421 to 427.

In FIG. 4B, if input of flicking the captured image in the left direction is received when the captured image 410 is selected, the controller 180 can display the fourth associated captured image 327 arranged in the right direction of the captured image 410 on the entire screen of the display unit 151. The user can thus easily view images captured from the execution screen of the same application without a complicated process.

If a link image 428 included in the fourth associated captured image 427 is selected, the controller 180 can execute the shopping service application based on the link data included in the link image 428. At this time, the displayed execution screen of the shopping service application may be a screen displayed if the fourth associated captured image 427 is captured.

Therefore, the user can enter the execution screen of the application through the associated captured image without a complicated process. According to the embodiment of the present invention, if a specific website screen is captured, a previous link page of the website can be automatically captured.

Figure 5A:
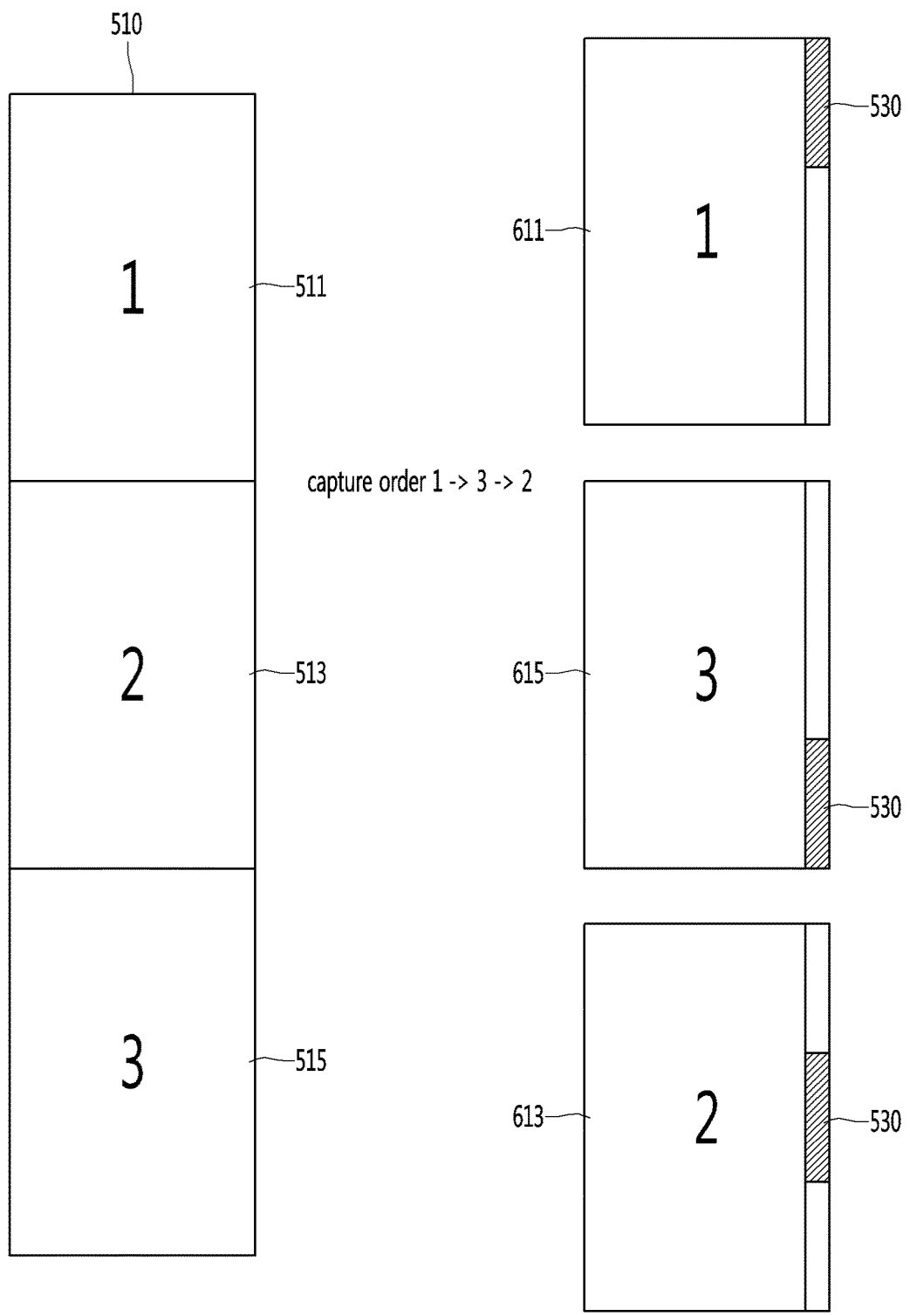

Next, FIGS. 5A and 5B are diagrams illustrating examples of providing associated captured images associated with a captured image according to another embodiment of the present invention. In particular, FIGS. 5A and 5B show an embodiment of providing associated captured images in order of content upon dividing one piece of content into a plurality of pages and capturing each page plural times.

Referring to FIG. 5A, the content 510 may include a plurality of pages 511 to 515 captured by the mobile terminal 100. The plurality of pages 511 to 515 can be arranged in order of the content 510. For example, the user can capture a first page 511, a third page 515 and a second page 513 in this order.

In the gallery application of the mobile terminal 100, a plurality of captured images 611 to 615 corresponding to the plurality of pages 511 to 515 can be stored in the above-described order. The captured image corresponding to each page may also include a scroll bar 530 indicating the location of each page among all pages of the content 510. The controller 180 can also store the locations of the scroll bars 530 included in the captured images, upon storing the plurality of captured images 611 to 615.

As shown in FIG. 5B, the captured image 611, the third image 615 and the second captured image 613 corresponding to the first page 511 can be arranged on the execution screen of the gallery application in capture order. If the first captured image 611 is selected, the first captured image 611 can be displayed on the entire screen of the display unit 151.

In one embodiment, if a touch input of selecting the first captured image 611 for a predetermined time is received, the controller 180 can arrange the associated captured images associated with the first captured image 611 in the upper, lower, left and right directions of the first captured image 611. In this state, if an input of flicking the first captured image 611 in the left direction is received, the controller 180 can display the second captured image 613 following the first captured image 611.

The controller 180 can also provide an associated captured image based on the location of the scroll bar 530 of the captured image, upon receiving flicking input. That is, the second captured image 613 immediately following the first captured image 611 corresponding to the first page 511 can be displayed. Therefore, the user can continuously view the content of the pages regardless of the capture time point.

In addition, if touch input of selecting the first captured image 511 for a predetermined time is received and input of flicking the first captured image 611 in the left direction is received, the controller 180 can display the second captured image 613 following the first captured image 611 as shown in FIG. 5B.

The controller 180 can also display the second captured image 613 based on the location of the scroll bar 530 of the captured image, upon receiving flicking input. Thus, the user can view the second captured image 613 following the first captured image 611 regardless of the capture time point. The associated captured images associated with the captured image may also be combined into one file.

Figure 6A:
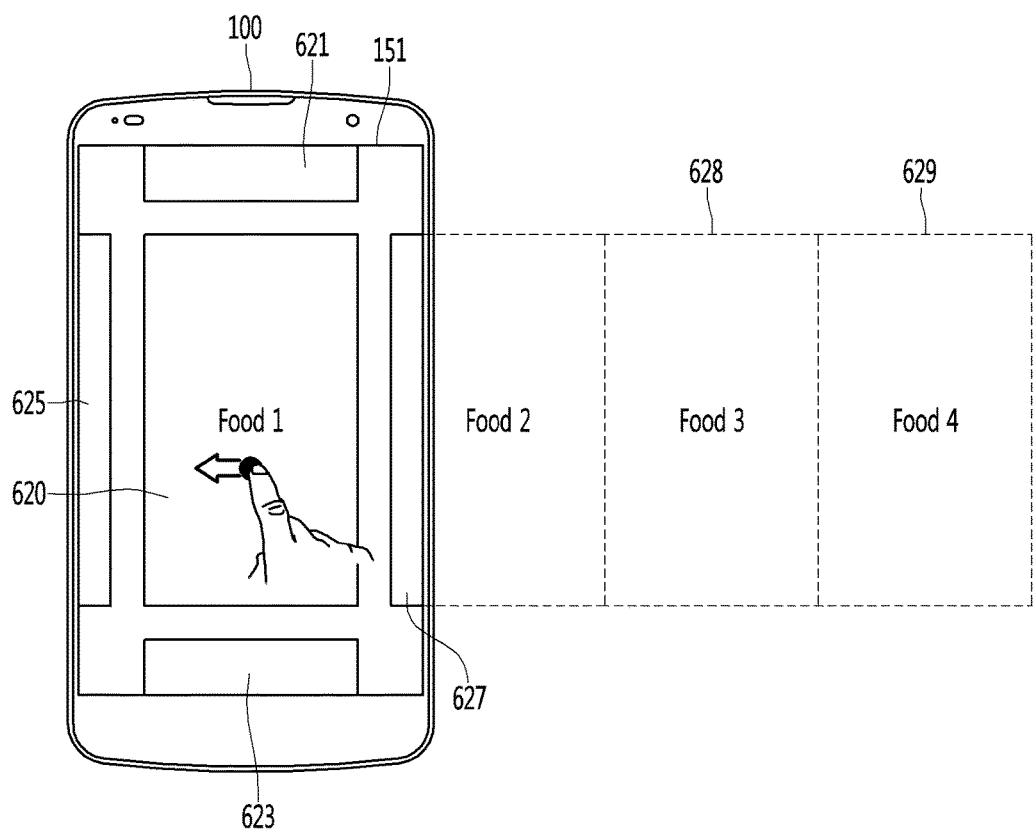
FIGS. 6A and 6B are diagrams illustrating examples of combining associated captured images associated with a captured image into one file according to an embodiment of the present invention.
Figure 6B:
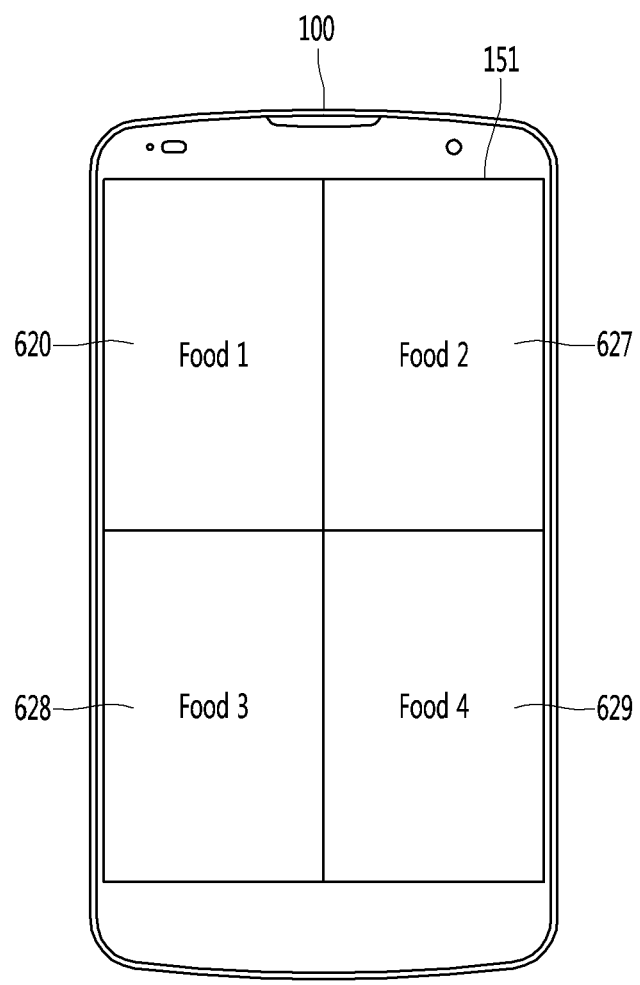

Next, FIGS. 6A and 6B are diagrams illustrating examples of combining associated captured images associated with a captured image into one file according to an embodiment of the present invention. Referring to FIG. 6A, some of a plurality of associated captured images 621 to 627 associated with a displayed captured image 620 are displayed.

The plurality of associated captured images 621 to 627 can be acquired based on content (e.g., content related to a food recipe) included in the captured image 620. The controller 180 can receive flicking input of moving the captured image and a request for selecting the associated captured images 627 to 629, after selecting the captured image 620 for a predetermined time or more. Thereafter, the controller 180 can combine the captured image 620 and the associated captured images 627 to 629 into one file (or one image) according to the request, as shown in FIG. 6B.

According to a related art method, the user has to confirm associated captured images while moving one image. However, according to the embodiment of the present invention, the user can confirm a captured image and associated captured images using one file without a complicated process.

Next, a description of FIG. 2 will be given again. If the app icon displayed on the captured image or each associated captured image is selected (S213), the controller 180 displays the execution screen of the application corresponding to the captured image (S215). The controller 180 can further display, on the captured image or each associated captured image, an app icon corresponding to the application for providing the screen if capturing the screen.

If the app icon is selected, the controller 180 can execute the application corresponding to the app icon and display the execution screen of the executed application. The execution screen of the application may correspond to the captured image or each associated captured image. That is, the execution screen of the application may be a screen which is displayed upon acquiring the captured image (upon capturing the content).

The user can then immediately view the execution screen of the application which is displayed upon acquiring the captured image (upon capturing the content). In addition, if the app icon is selected for a predetermined time or more, the controller 180 can display the images captured through the application corresponding to the app icon on one screen. That is, the execution screen of the application can be displayed through different inputs for the app icon or images captured through the application can be displayed on one screen.

This will be described with reference to FIG. 7. In particular, FIG. 7 is a diagram illustrating an example of displaying an execution screen of an application corresponding to a captured image if an app icon displayed on the captured image or an associated captured image is selected, according to an embodiment of the present invention.

Figure 7:
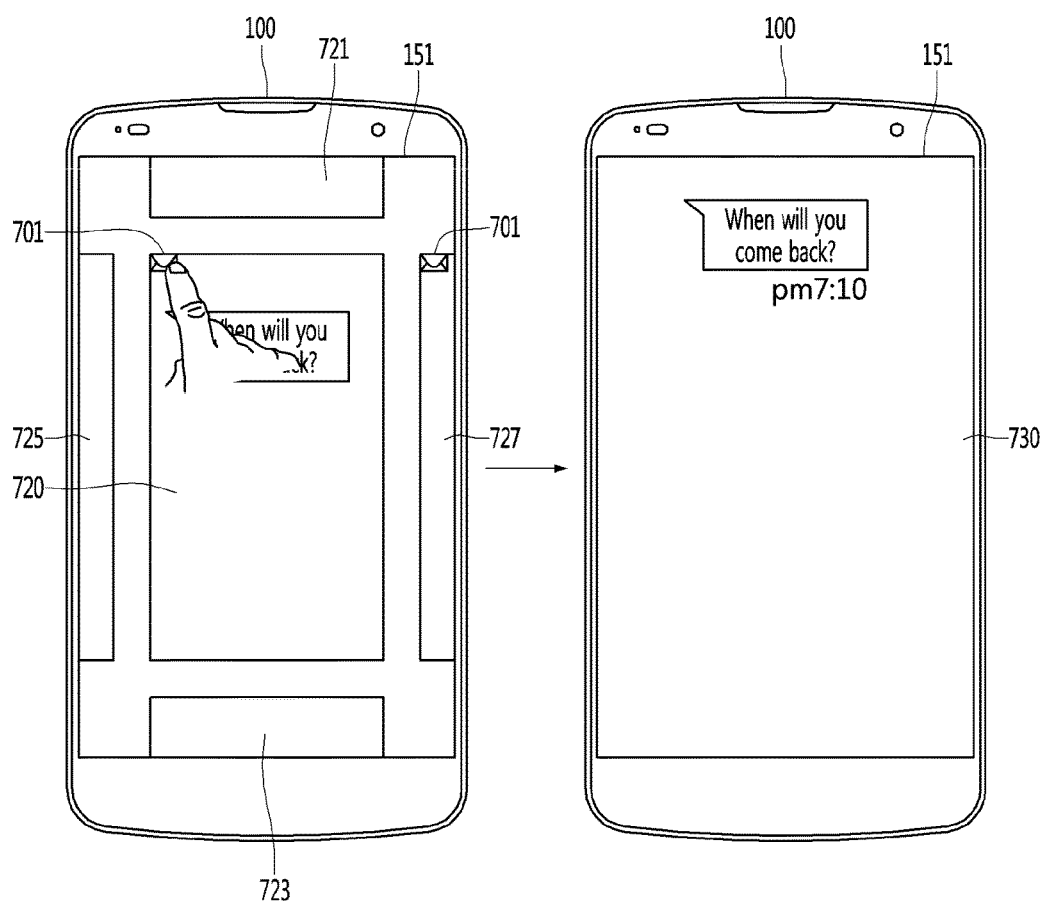
FIG. 7 is a diagram illustrating an example of displaying an execution screen of an application corresponding to a captured image if an app icon displayed on the captured image or an associated captured image is selected, according to an embodiment of the present invention.

Referring to FIG. 7, the display unit 151 displays a captured image 720 and associated captured images 721 to 727. An app icon 701 corresponding to an application for providing the screen may be further displayed on the captured image 720. The captured image 720 can be acquired by capturing the execution screen of a message application.

If the app icon 701 is selected, the controller 180 can execute a message application corresponding to the captured image 720. Therefore, the controller 180 can control the execution screen 730 of the message application. The execution screen 730 of the message application may include the content included in the captured image 720 if acquiring the captured image 720, without change. That is, the execution screen upon acquiring the captured image 720 can be displayed.

In addition, the controller 180 can display the execution screen of the message application based on the information on the message application stored along with the captured image 720 and the content of the captured image 720. According to the embodiment of the present invention, the captured images associated with a selected item may be provided according to selection of an item included in the captured image.

Figure 8A:
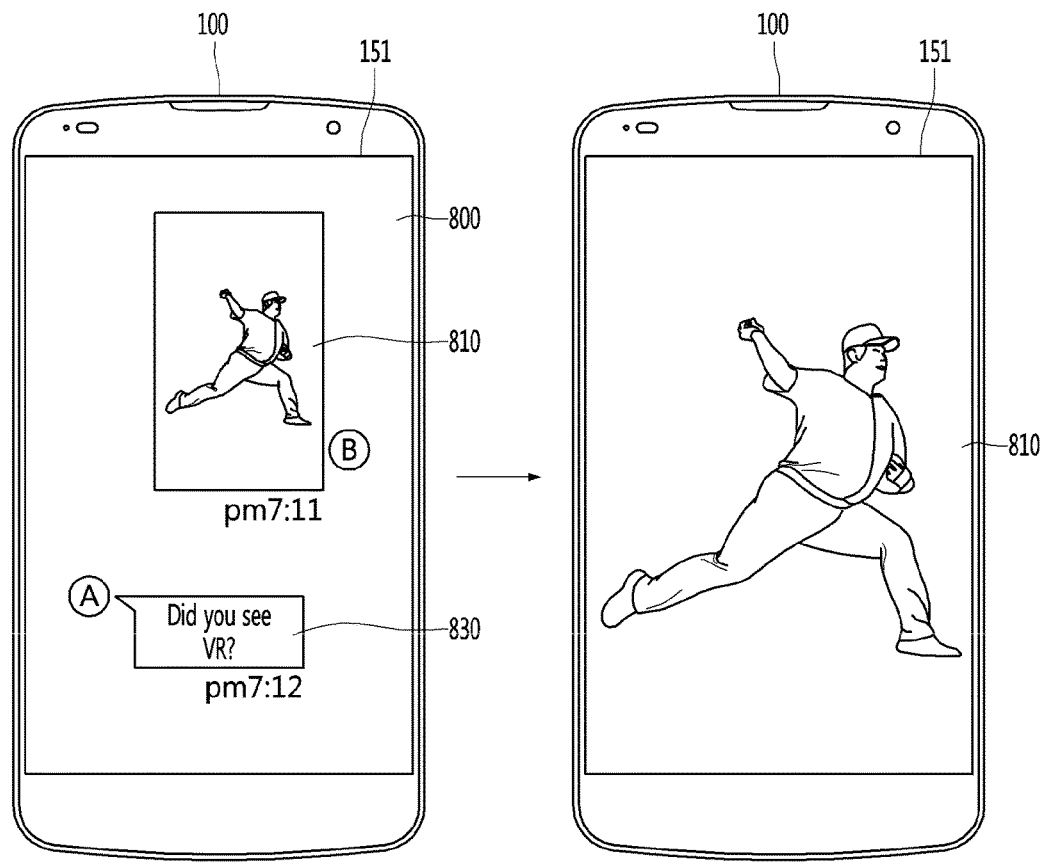
FIGS. 8A and 8B are diagrams illustrating examples of providing a captured image associated with a selected item according to selection of the item included in the captured image according to an embodiment of the present invention.
Figure 8B:
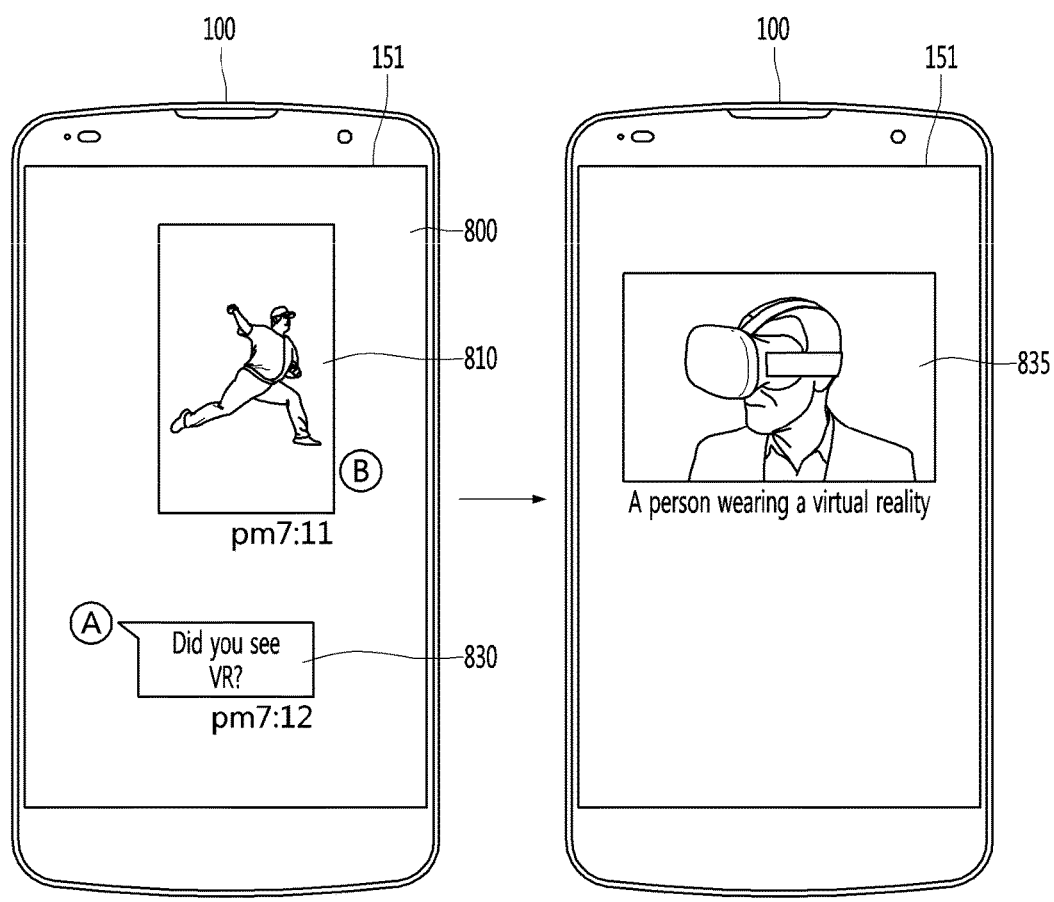

Next, FIGS. 8A and 8B are diagrams illustrating examples of providing a captured image associated with a selected item according to selection of the item included in the captured image according to an embodiment of the present invention. Referring to FIG. 8A, the display unit 151 of the mobile terminal 100 displays a captured image 800.

The captured image 800 can be acquired by capturing the execution screen of a message service application for having a conversation or exchanging an image with a counterpart.

The captured image 800 may also include a shared image item 810 including images shared with the counterpart and a text item 830 including text including a conversation with a counterpart.

If the shared image item 810 is selected for a predetermined time or more, the controller 180 can search the memory 170 for a shared image 810 corresponding to the shared image item 810. The controller 180 can display the searched shared image 810 on the display unit 151.

Next, a description of FIG. 8B will be given. If the text item 830 is selected for a predetermined time or more, the controller 180 can extract an image related to the content of the text item 830 from the captured images stored in the memory 170. For example, if the text item 830 includes <VR>, the controller 180 can search the memory 170 for the captured images related to virtual reality. The controller 180 can also display an associated captured image 835 related to virtual reality according to the search result.

If the captured image related to virtual reality is not stored in the memory 170, the controller 180 can arrange associated captured images related to the captured image 810 in the upper, lower, left and right directions of the captured image. A user can thus select an item included in a captured image without a search process to easily receive captured images related to the item. According to the embodiment of the present invention, only captured images including text may be provided based on text input in the search bar.

Figure 9:
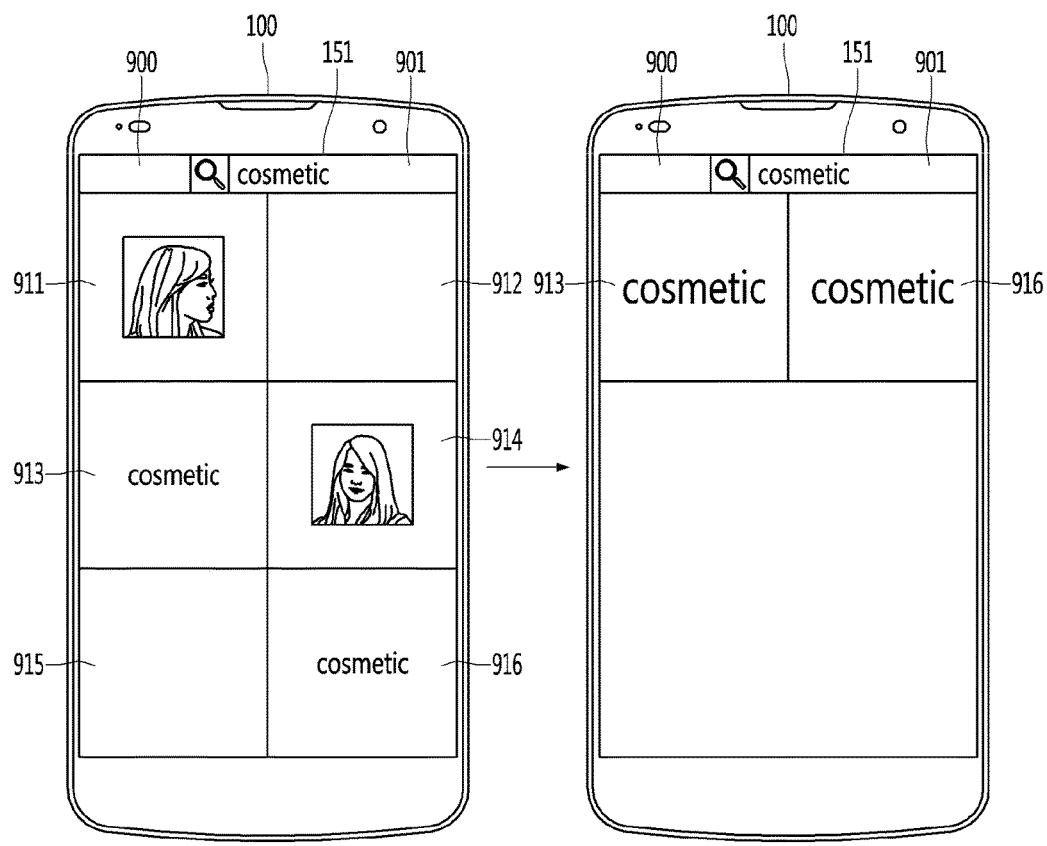
FIG. 9 is a diagram showing an example of providing a captured image including input text based on text input in a search bar according to an embodiment of the present invention.

Next, FIG. 9 is a diagram showing an example of providing a captured image including input text based on text input in a search bar according to an embodiment of the present invention. Referring to FIG. 9, the display unit 151 of the mobile terminal 100 can display the execution screen 900 of a gallery application including a plurality of captured images 911 to 916.

The execution screen 900 of the gallery application may include a search bar 901 for search. If text <cosmetic> is input in the search bar 901, the controller 180 can search the plurality of captured images 911 to 916 for an image including <cosmetic>. The controller 180 can also search for an image including text input in the search bar 901 in the captured image using an optical character recognition scheme.

In addition, the controller 180 can translate English text into Korean text and search for a captured image including the translated Korean text. In contrast, the controller 180 can translate Korean text into English text and search for a captured image including English text. The controller 180 can then display captured images 913 and 916 including <cosmetic> according to the search result.

In particular, the controller 180 can enlarge and display a part including <cosmetic> included in the searched captured image 913. A user can then rapidly confirm the captured images including an input search word. According to another embodiment of the present invention, if the name of a person is input in a search bar, captured images including the person may be searched for.

Figure 10:
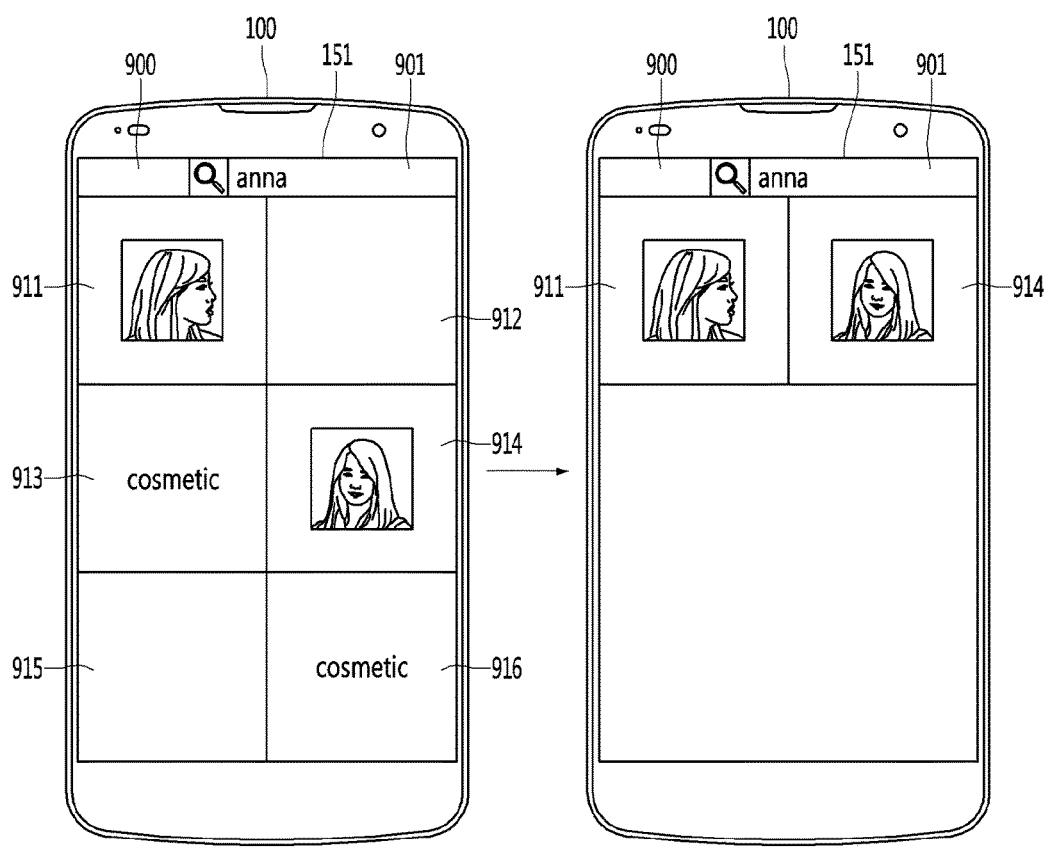
FIG. 10 is a diagram illustrating an example of providing captured images corresponding to the name of a person based on the name of the person input in a search bar according to another embodiment of the present invention.

Next, FIG. 10 is a diagram illustrating an example of providing captured images corresponding to the name of a person based on the name of the person input in a search bar according to another embodiment of the present invention. In FIG. 10, the description of the same parts as FIG. 9 are omitted.

Referring to FIG. 10, if the name of a person <anna> is input in the search bar 901, the controller 180 can search for captured images of the person having the name <anna>. If a captured image includes the face of the person, the captured image may be stored along with the name of the person.

The controller 180 can display only the captured images 911 and 914 corresponding to the input name of the person. The user can rapidly confirm the captured images corresponding to the input name of the person. According to another embodiment of the present invention, associated captured images associated with the captured image may be provided according to input for dragging and dropping a captured image in a search bar.

Figure 11:
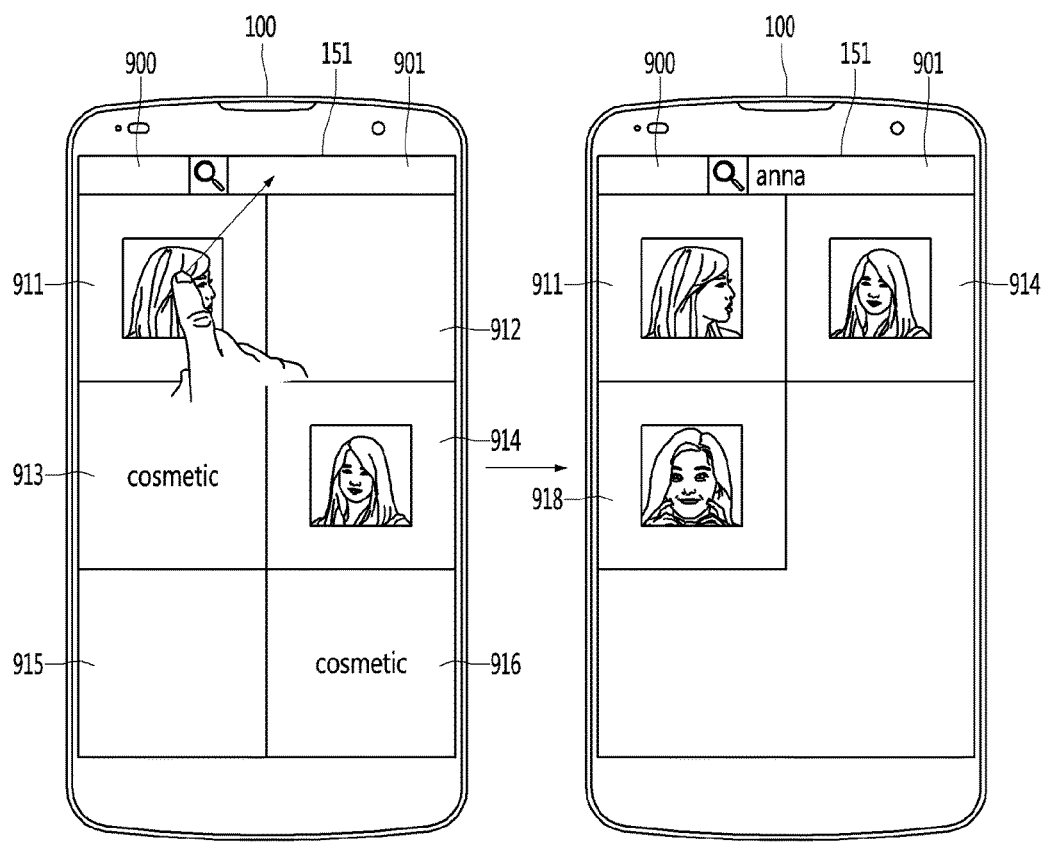
FIG. 11 is a diagram illustrating an example of providing associated captured images by dragging and dropping a captured image in a search bar according to an embodiment of the present invention.

Next, FIG. 11 is a diagram illustrating an example of providing associated captured images by dragging and dropping a captured image in a search bar according to an embodiment of the present invention. In FIG. 11, description of the same parts as FIG. 9 will be omitted. Referring to FIG. 11, if input of dragging and dropping a captured image 911 in the search bar 901 is received, the controller 180 can acquire associated captured images including the face of the person based on the face of the person included in the captured image 911. The controller 180 can also extract the name of the person included in the captured image 911 and display text corresponding to the extracted name of the person in the search bar 901.

In addition, the controller 180 can transmit the captured image 911 to an external server and acquire the name of the person included in the captured image 911 from the external server. The controller 180 can also display the text of the acquired name in the search bar 901.

Further, the controller 180 can display only captured images 911, 914 and 918 including the face of the person among the captured images stored in the memory 170 based on the name of the person. A user can thus search for associated captured images using a captured image without inputting text. According to another embodiment of the present invention, only images captured from an application corresponding to an app icon may be provided through the app icon displayed on a captured image.

Figure 12:
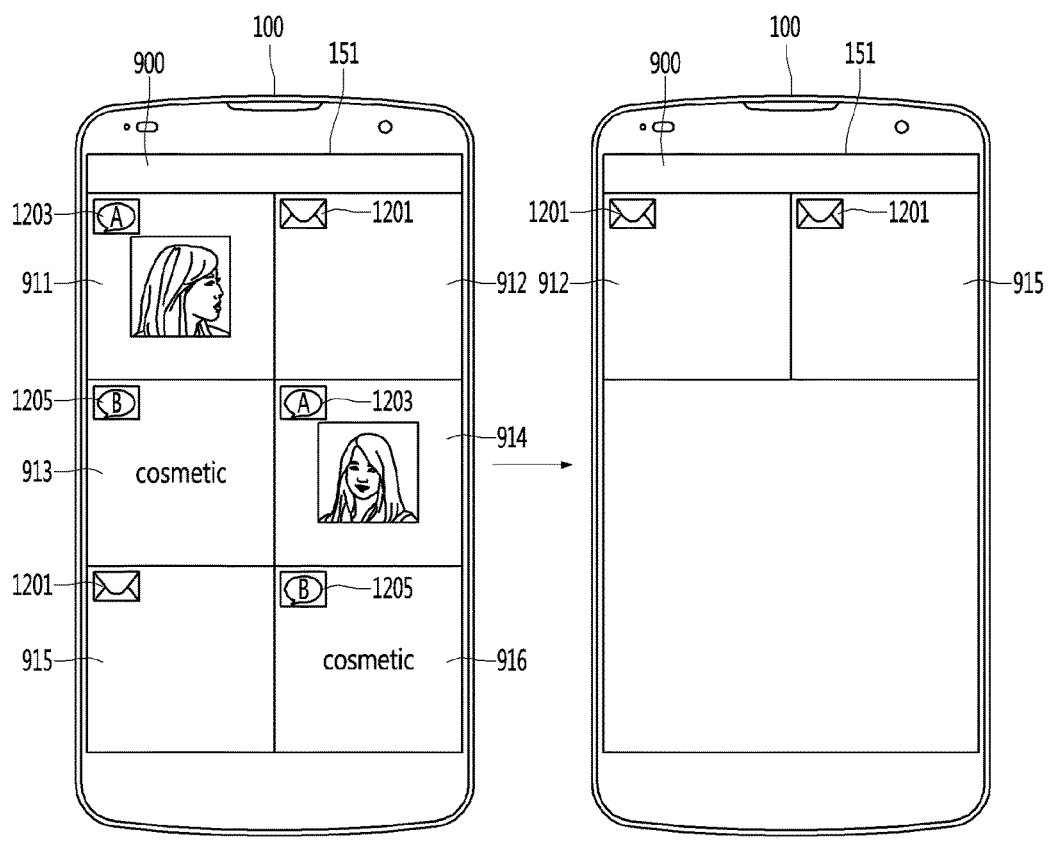
FIG. 12 is a diagram illustrating an example of providing images captured from an application corresponding to an app icon according to a request for selecting the app icon displayed on a captured image according to an embodiment of the present invention.

Next, FIG. 12 is a diagram illustrating an example of providing images captured from an application corresponding to an app icon according to a request for selecting the app icon displayed on a captured image according to an embodiment of the present invention. In FIG. 12, description of the same parts as FIG. 9 are omitted.

Referring to FIG. 12, an app icon may be further displayed on each captured image. For example, a first app icon 1201 corresponding to captured images 912 and 915 can be displayed, a second app icon 1203 corresponding to captured images 911 and 914 can be displayed and a third app icon corresponding to captured images 913 and 916 can be displayed.

If the first app icon 1201 is selected, the controller 180 can display only the captured images 912 and 915 acquired by capturing the execution screen of the application corresponding to the first app icon 1201. A user can rapidly confirm the images captured from a specific application.

In another embodiment of the present invention, if the first app icon 1201 is selected for a predetermined time or more, the controller 180 can display the execution screen of the application corresponding to the first app icon 1201. In addition, the execution screen of the application may be a screen displayed upon acquiring the captured image 911. According to another embodiment of the present invention, the content of a captured image may be extracted according to swipe input and an execution screen of an application may be provided based on the extracted content.

Figure 13:
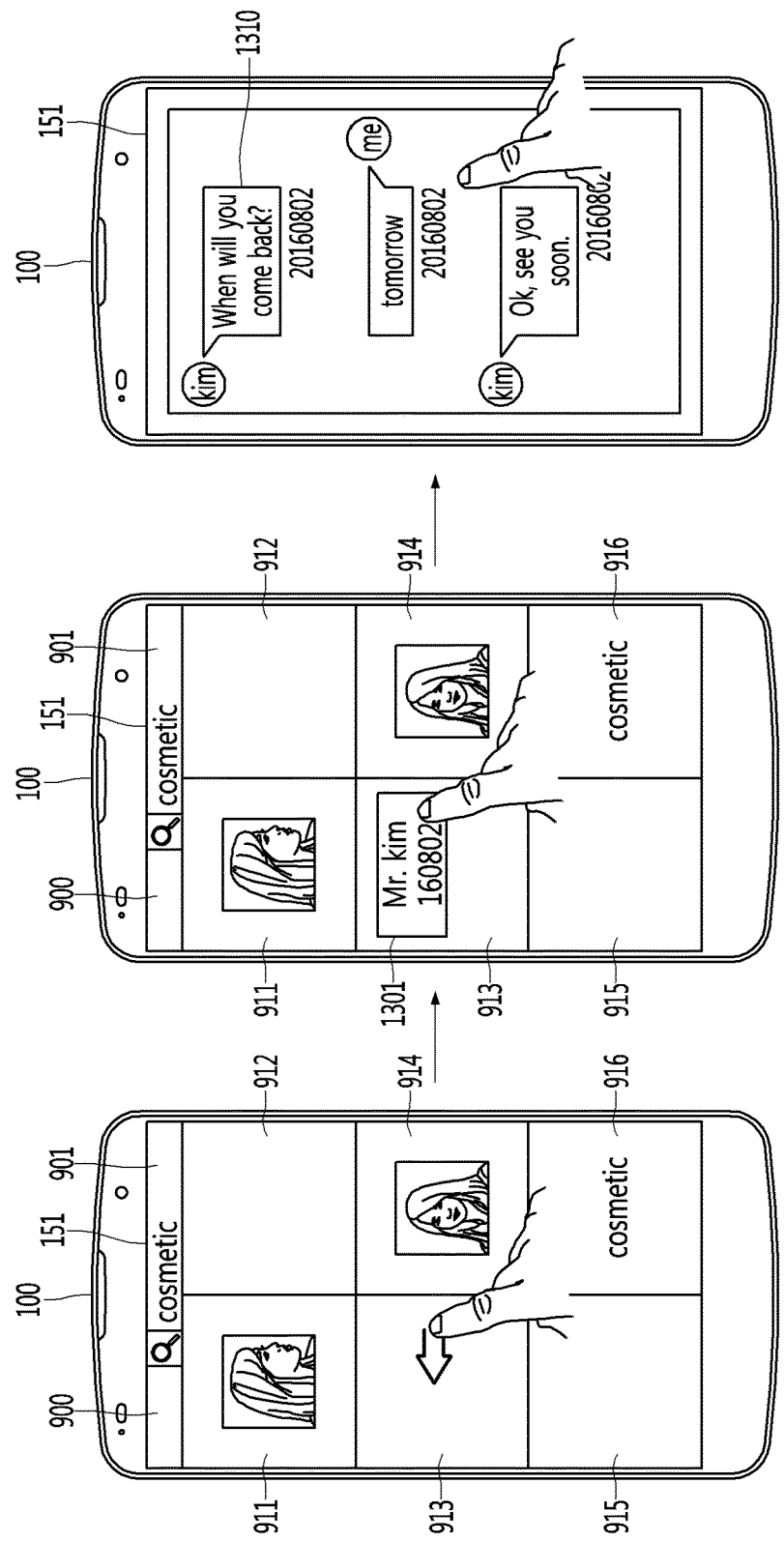
FIG. 13 is a diagram illustrating an example of providing an execution screen of an application associated with information on an extracted captured image in response to swipe input according to another embodiment of the present invention.

Next, FIG. 13 is a diagram illustrating an example of providing an execution screen of an application associated with information on an extracted captured image in response to swipe input according to another embodiment of the present invention. In FIG. 13, description of the same parts as FIG. 9 will be omitted.

Referring to FIG. 13, the controller 180 can receive swipe input with respect to the captured image 913 displayed on the execution screen 900 of the gallery application. The controller 180 can also acquire information on the captured image 913 in response to swipe input. The captured image 913 can be acquired by capturing the execution screen of a message service application.

Information on the captured image 913 may include information on the application, the name of a conversation counterpart, a conversation date, etc. The controller 180 can then display the information on the extracted captured image 913 on the captured image 913 in response to swipe input.

The controller 180 can also display the execution screen 1310 of the message service application based on the information if the information on the captured image 913 is selected. The execution screen 1310 of the message service application may include the content of the conversation corresponding to the conversation date. A user can then execute the application through the information extracted from the captured image to confirm the content of the conversation with the counterpart.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a memory;
a display configured to display a captured image; and
a controller configured to:
receive a request for acquiring associated captured images associated with the captured image,
acquire the associated captured images based on information on the captured image stored in the memory according to the received request, and
display, around the captured image, a first set of associated captured images captured through an application corresponding to the captured image and a second set of associated captured images acquired based on information included in the captured image among the acquired associated captured images,
wherein the controller is further configured to display an app icon corresponding to the application on the captured image and display images captured through the application on one screen in response to the app icon being selected for a predetermined time or more.

2. The mobile terminal according to claim 1, wherein the controller is configured to:
display the first set of associated captured images in upper and lower directions of the captured image, and
display the second set of associated captured images in left and right directions of the captured image.

3. The mobile terminal according to claim 2, wherein the controller is configured to display the first set of associated captured images in the upper and lower directions of the captured image according to a capture time point.

4. The mobile terminal according to claim 1, wherein the controller is configured to:
scale down the captured image according to the request, and
display some of the first set of associated captured images and some of the second set of associated captured images around the scaled down captured image.

5. The mobile terminal according to claim 1, wherein the information included in the captured image includes content of a conversation with a counterpart included in the captured image and each of the second set of associated captured images includes content of another conversation with the counterpart based on the content of the conversation included in the captured image.

6. The mobile terminal according to claim 1, wherein the information included in the captured image includes link information of a web site and each of the second set of associated captured images is acquired by capturing a screen of the website corresponding to the link information.

7. The mobile terminal according to claim 1, wherein the information on the captured image includes a location of a scroll bar indicating a location of a page corresponding to the captured image, and
wherein the controller is further configured to display a corresponding associated captured image following the captured image based on the location of the scroll bar, in response to an image change request being received.

8. The mobile terminal according to claim 1, wherein the controller is further configured to display the app icon corresponding to the application on the captured image, and display an execution screen of the application in response to the app icon being selected, and
wherein the execution screen of the application is a screen displayed upon acquiring the captured image.

9. The mobile terminal according to claim 1, wherein the request for acquiring the associated captured images is a request for selecting the captured image for a predetermined time.

10. The mobile terminal according to claim 1, wherein the controller is further configured to combine the second set of associated captured images into one image and display the one image.

11. A mobile terminal comprising:
a memory;
a display configured to display a captured image; and
a controller configured to:
acquire associated captured images based on information on the captured image stored in the memory,
display a first set of associated captured images captured through an application corresponding to the captured image among the acquired associated captured images in upper and lower directions of the captured image, and
display a second set of associated captured images acquired based on information included in the captured image in left and right directions of the captured image,
wherein the controller is further configured to display an app icon corresponding to the application on the captured image and displays images captured through the application on one screen if the app icon is selected for a predetermined time or more.

12. The mobile terminal according to claim 11, wherein the controller is further configured to display the first set of associated captured images in upper and lower directions of the captured image according to a capture time point.

13. The mobile terminal according to claim 11, wherein the controller is further configured to scale down the captured image according to the request and display some of the first set of associated captured images and some of the second set of associated captured images around the scaled down captured image.

14. The mobile terminal according to claim 11, wherein the information included in the captured image includes content of a conversation with a counterpart included in the captured image and each of the second set of associated captured images includes content of another conversation with the counterpart based on the content of the conversation included in the captured image.

15. The mobile terminal according to claim 11, wherein the information included in the captured image includes link information of a web site and each of the second set of associated captured images is acquired by capturing a screen of the web site corresponding to the link information.

16. The mobile terminal according to claim 11, wherein the information on the captured image includes a location of a scroll bar indicating a location of a page corresponding to the captured image, and
wherein the controller is further configured to display a corresponding associated captured image following the captured image based on the location of the scroll bar, if an image change request is received.

17. The mobile terminal according to claim 11, wherein the controller is further configured to display the app icon corresponding to the application on the captured image and displays an execution screen of the application if the app icon is selected, and
wherein the execution screen of the application is a screen displayed upon acquiring the captured image.

18. The mobile terminal according to claim 11, wherein the controller is further configured to combine the second set of associated captured images into one image and display the one image.

* * * * *